Figure 1:
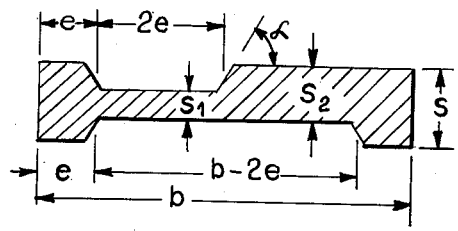

April 16, 1963 G. HAUPT ET AL 3,085,318
STRIP FOR THE PRODUCTION OF STRIP-WOUND HIGH-PRESSURE VESSELS
Filed Aug. 30, 1961

INVENTORS:
GUSTAV HAUPT
LUDWIG RAICHLE
HANS JUNG
BY
ATT'YS

United States Patent Office 3,085,318
Patented Apr. 16, 1963

3,085,318
STRIP FOR THE PRODUCTION OF STRIP-WOUND HIGH-PRESSURE VESSELS
Gustav Haupt, Limburgerhof, Pfalz, and Ludwig Raichle and Hans Jung, Ludwigshafen (Rhine), Germany, assignors to Badische Anilin- & Soda-Fabrik Aktiengesellschaft, Ludwigshafen (Rhine), Germany
Filed Aug. 30, 1961, Ser. No. 135,066
Claims priority, application Germany Sept. 2, 1960
2 Claims. (Cl. 29—183.5)

This invention relates to the production of high-pressure vessels. More particularly, it relates to the production of high-pressure vessels made from rolled heated strip, the strip being provided on its upper and lower sides with grooves that take care of the longitudinal stresses occurring in the vessel.

It is known to use for the production of high-pressure strip-wound vessels, strip which has a symmetrical cross-section with grooves on the upper and lower sides. The flanks of the grooves are arranged at an angle of 90° to the outer face.

The upper of the wide sides has three rectangular grooves, opposite which three tongues of equal size are arranged on the lower wide side. During the winding-on operation, the tongues on one strip interlock two strips lying beneath the same, into the grooves of which they engage. Strips with only two grooves and two tongues have also been proposed.

Depending on the number of tongues and grooves in a cross-section of the vessel, joints in the known type profile come to lie above other joints perpendicular to the longitudinal axis of the vessel after two or three layers of strip. Moreover, the internal stresses produced in the strip depend on the shaping of the strip during winding on and on the unavoidable gap between the strip and the underlying layer. Finally, numerous rectangular grooves are present in the core tube, the most sensitive part of a strip-wound vessel, and these weaken the core tube.

It is an object of the present invention to eliminate the said disadvantages and to provide for a strip with a profile such that in the finished strip-wound high-pressure vessel only a very small number of joints between two adjacent strips occur in a cross-section perpendicular to the axis of the vessel.

Another object of this invention is to reduce the number of joints between the strips in a strip-wound vessel. Another object of the invention is to provide a profile for a strip which allows of influencing the longitudinal stresses and of using the layers in the same degree as the core tube for taking care of the longitudinal stresses. Another object of the invention is the production of a strip-wound vessel whose physical properties approximate closely to those of a solid-wall tube vessel of the same dimensions.

These objects are achieved by the profile according to our invention. Contrasted with prior profiles, it has an unsymmetrical cross-section. With a rectangular basic shape with a width $b$ and a thickness $s$, the new profile has inclined flanks and on the upper side a groove which is staggered with respect to the middle of the strip. The width of this groove, measured from the middle of the inclined flanks, is $2e$. This groove is arranged at a distance from the edges of the strip of $e$ and $(b-3e)$. The underside of the profile has a groove having a width of $(b-2e)$ which is arranged symmetrically with respect to the middle of the strip.

It is important that the total width of the profile $b$ is not a multiple of the edge distance $e$. Otherwise two joints will be superposed in a cross-section of the vessel perpendicular to its axis after $$n = \frac{b}{2e}$$

layers.

These and other details of the invention will become evident from the following detailed description which should be read with reference to the accompanying drawing, but it will be understood that the embodiment of the invention illustrated is given by way of example only and not by way of limitation.

Figure 2:
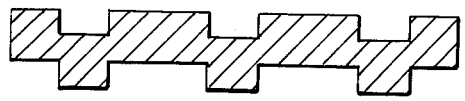
Figure 3:
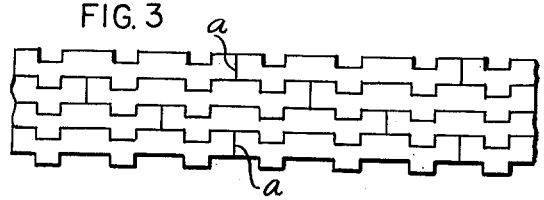
Figure 4:
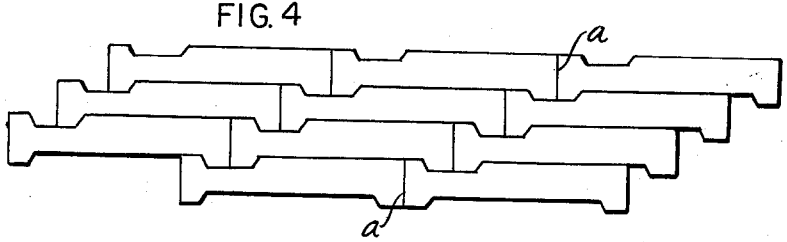
Figure 5:
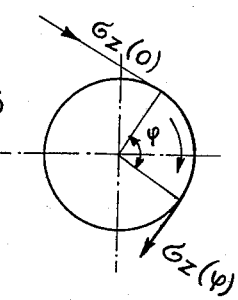

FIGURE 1 is a cross-section through a strip according to this invention. FIGURE 2 is a cross-section through a conventional type strip. FIGURE 3 shows part of a strip-wound vessel for the production of which the profile shown in FIGURE 2 has been used. FIGURE 4 shows part of a strip-wound vessel for the production of which the new strip according to FIGURE 1 has been used. FIGURE 5 illustrates the longitudinal stresses in the strip during winding.

The angle of the edges of the grooves is less than 90°. Because the strips interlock at their edges, the shaping and the transfer of stresses is substantially independent of the tolerances of the band. By choosing the edge angle appropriately, the internal stresses produced in a strip-wound vessel during winding or after cooling, especially the longitudinal internal stresses, can be influenced. Using this profile, strip-wound vessels can be produced having predetermined internal stresses independently of the temperature used during winding and of the tolerances of the strip.

By the asymmetric shape of the strip and the inclined flanks, the number of joints and notches in a finished strip-wound vessel and also the insecurity are decreased. By suitable choice of the dimensions and the positions of the grooves in the strip, it is possible to ensure, in contrast to conventional strip profiles, that in a particular cross-section of the vessel, joints between the strips do not occur in superposed position until after $n$ layers, so that the properties of the strip-wound vessel approximate to the properties of a solid-wall vessel.

With a strip width $b$ and a mean tongue width $e$, a joint between two strips is not superposed over another in the same cross-section of the vessel until after $n$ layers. Superposition is dependent on the dimensions of the strip and the number of layers $n$. Using the said designations for the strip, $x \cdot b = n \cdot 2e$; $x$ and $n$ are whole numbers. $n$ denotes the number of layers which must be wound on before a joint is immediately above a joint in a previous layer. $x$ is the number of windings. When using the known symmetrical strip profiles, the superposition is determined by the number of grooves. With a strip having three grooves, the joints are superposed after three layers.

The drawing shows by way of example a strip according to the invention.

The new strip profile (FIGURE 1) having a width $b$ and a thickness $s$, has a groove in the upper face and a groove in the lower face. The groove in the upper face is unsymmetrically located and has a mean width of $2e$ and a mean distance of $e$ from the edge of the strip. The tongues on the upper face of the strip accordingly have a means width of $e$ and $b-3e$. It is possible to choose the mean distance of the groove on the upper side from the edge of the strip smaller or larger than $e$ and to adapt the dimensions of the strip dependent thereon to this value.

The groove in the under face of the strip is located symmetrically to the middle of the strip and has a mean width of $b-2e$. The two tongues on the under face have a mean width of $e$. The angle $\alpha$ between each flank of the groove and the outer faces has a value less than 90°.

The thickness of the strip is $s$ at the edges and $s_1$ and $s_2$ therebetween. Conventional strip (FIGURE 2) has three rectangular grooves arranged symmetrically and three corresponding tongues. FIGURES 3 and 4 show the strips of FIGURES 1 and 2 after having been wound on, the joints being indicated at $a$.

The strip (FIGURE 5) is applied to the vessel with a tensile stress $\delta_{z(0)}$ and, depending on the angle $\varphi$ has a tensile internal stress of $\delta_z(\varphi)$, i.e.

$$\delta_z(\varphi) = \delta_{z(0)} \cdot e^{\mu x}$$

In this equation, $\mu$ denotes the coefficient of friction between the strip and the support, and $e$ is the base of natural logarithms.

If the strip is wound on at a temperature of, for example, 600° C., the value $\delta_{z(0)}$ is very small according to the low value of the thermal yield point. The degree of shrinkage stresses in the tangential direction can be varied by influencing the coefficient of friction $\mu$. $\mu$ depends on the strip profile and also on the local strip strength during winding on.

The following example will illustrate the invention without limiting it.

EXAMPLE

The calculation of a strip-wound vessel for a conventional type profile and for a new profile is compared by way of example:

$D_0 = 500$ mm.—internal diameter
$S_k = 30$ mm.—thickness of core tube
$\delta_{0.2} = 30$ kg./sq. mm. yield point of the material of the core tube

*Strip Specifications*

|  | conventional strip profile | new strip profile |
|---|---|---|
| flank width $h$ | 2.5 mm | 2.5 mm. |
| thickness $s$ | 8 mm | 8 mm. |
| mean width of groove $b$ | 0 mm | 20 mm. |
| flank angle $\varphi$ | 90° | 60°. |
| permissible stress $\delta_{per}$ | 50 kg./sq. mm | 50 kg./sq. mm. |
| wall temperature $t$ | 20° C | 20° C. |

For a stress in the pressure vessel at which the internal pressure is just so high that plastic deformation of the innermost layer begins, the internal pressures are as follows:

| Total number of layers $n$ | Elastic-breakdown pressure (longitudinal stresses) | | Elastic-breakdown pressure (hoop stresses) | |
|---|---|---|---|---|
|  | conventional type profile, at. | new profile, at. | conventional type profile, at. | new profile, at. |
| 5 | 800 | 1,200 | 1,200 | 1,200 |
| 10 | 1,587 | 2,900 | 2,000 | 2,000 |

Thus, whereas as regards tangential stresses, the two profiles behave identically, the new profile withstands an internal pressure which is 50 to 80% higher, as regards longitudinal stresses strip-wound vessels made from the new profile thus approximate under stress to the behavior of a solid-wall vessel.

We claim:
1. A strip for the production of high-pressure strip-wound vessels, said strip having a basically rectangular cross-section with upper and lower width $b$ and a thickness $s$, the cross-sectional profile being unsymmetrical and having a groove in the upper face of the strip, said groove being unsymmetrically located with respect to the middle of the strip and with a distance between the middle of the flanks of the groove equal to $2e$ and a distance between the middle of the sides of the groove and the edges of the strip of $e$ and $b-3e$, and having a groove, symmetrical with respect to the middle of the strip, in the lower face, the width between the middle of the sides of the groove being equal to $b-2e$.

2. A strip as claimed in claim 1 wherein the angle between the flanks of the grooves and the upper and lower faces of the strips is less than 90°.

References Cited in the file of this patent

UNITED STATES PATENTS

| 75,770 | Kloman | Mar. 24, 1868 |
| 2,219,805 | Buttress | Oct. 29, 1940 |

FOREIGN PATENTS

| 378,834 | Great Britain | Aug. 18, 1932 |